Figure 4:
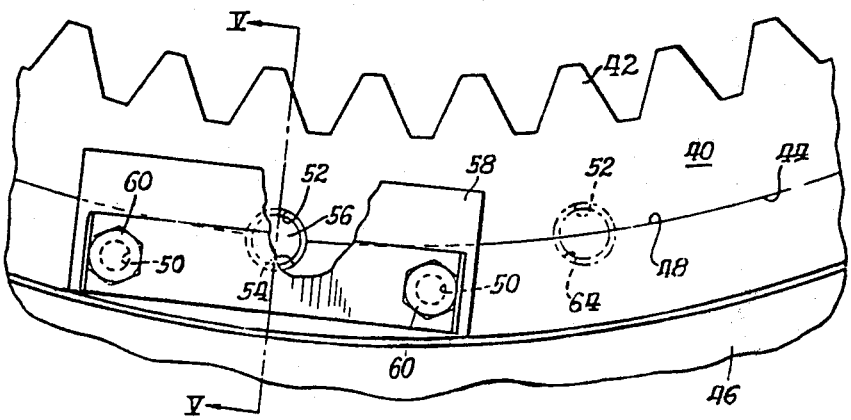
Figure 5:
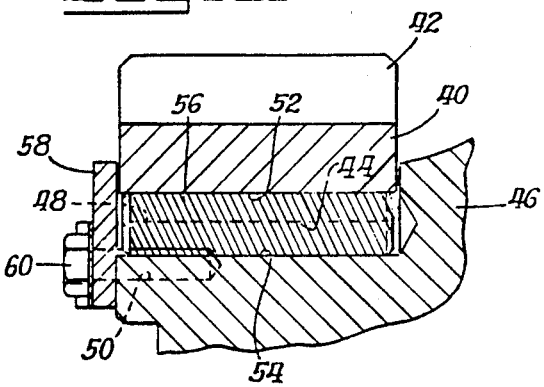
Figure 6:
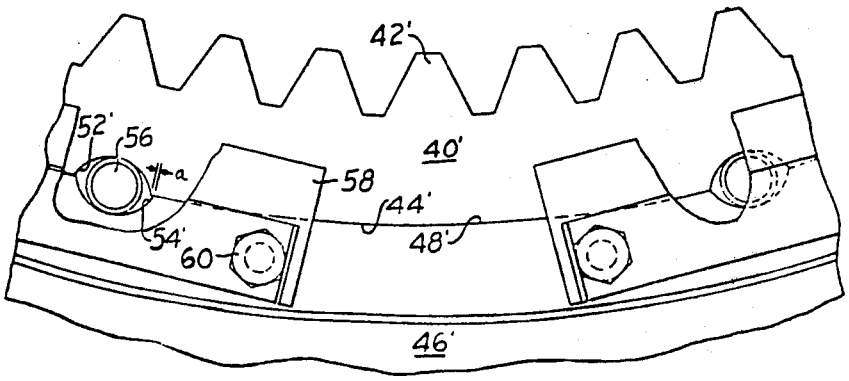
Figure 7:
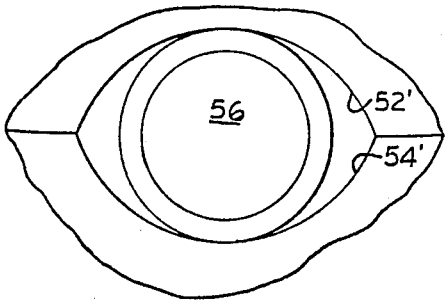

United States Defensive Publication [19] (H) [11] T102,903

Orr [43] Apr. 5, 1983

[54] PINNED-ON PLANETARY RING GEAR ASSEMBLY AND SALVAGE METHOD

[76] Inventor: Robert S. Orr, 5 Rosewood La., Pekin, Ill. 61554

[21] Appl. No.: 719,027

[22] Filed: Aug. 30, 1976

Related U.S. Application Data

[63] Continuation of Ser. No. 546,949, Feb. 4, 1975, abandoned, and a continuation-in-part of Ser. No. 385,901, Aug. 6, 1973, abandoned.

[51] Int. Cl.[2] ..... F16H 1/28

[52] U.S. Cl. ..... 74/801

[57] ABSTRACT

A ring gear mounted within a final drive or transmission housing and fixed against rotation with respect thereto. The ring gear is provided with a plurality of angularly spaced peripheral semi-circular recesses contiguous with opposing recesses in a peripheral portion of the housing. Drive pins are inserted within the circular apertures formed by the opposed semi-circular recesses. The pins and the ring gear are retained against axial movement by means of keeper plates fastened to a peripheral portion of the housing. In a preferred embodiment the diameters of the angularly spaced peripheral semi-circular recesses are greater than those of the drive pins and the centers of rotation of such enlarged semi-circular recesses are displaced from the centers of the drive pins. A method of salvaging a ring gear-housing assembly having a worn housing spline. The method includes providing the formerly described semi-circular recesses in peripheral portions of the ring gear and housing, providing drive pins for the aperture formed thereby, and providing keeper plates for retaining the ring gear and drive pins against axial movement. A method of salvaging a ring gear-housing assembly having worn semi-circular ring gear retaining recesses in the periphery of the housing. The method includes removing axial retention keeper plates from the housing, removing the drive pins from the apertures formed by the opposing semi-circular recesses in the ring gear and housing, angularly displacing the ring gear with respect to the housing, providing additional semi-circular recesses in the periphery of the housing at points thereof contiguous with the semi-circular recesses provided in the displaced ring gear, installing drive pins in the apertures formed by the semi-circular recesses in the ring gear and newly provided recesses in housing, and installing keeper plates to retain the pins and ring gear against axial movement.

1 Claim, 3 Sheets Drawing,

14 Pages Specification

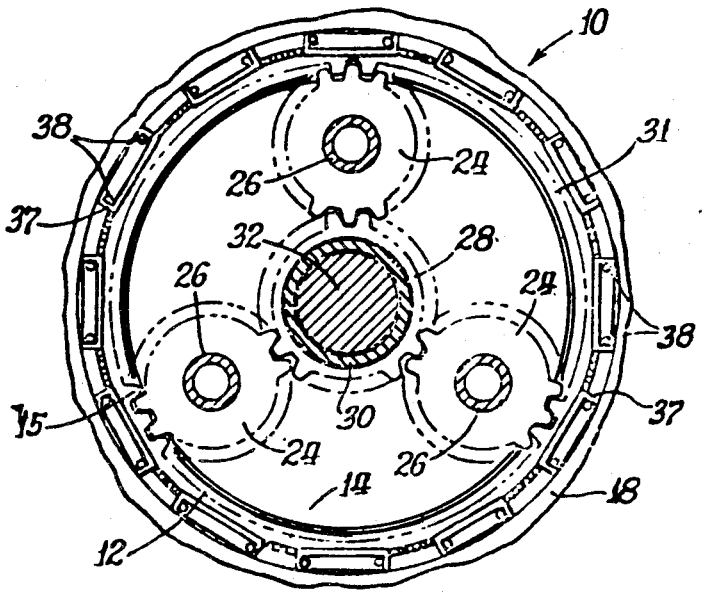

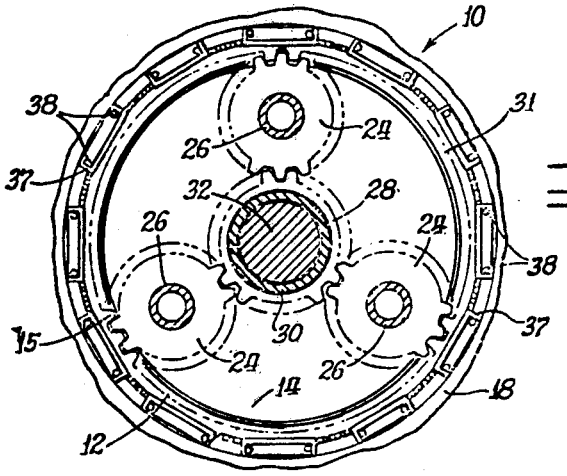
Fig. 1
Fig. 2
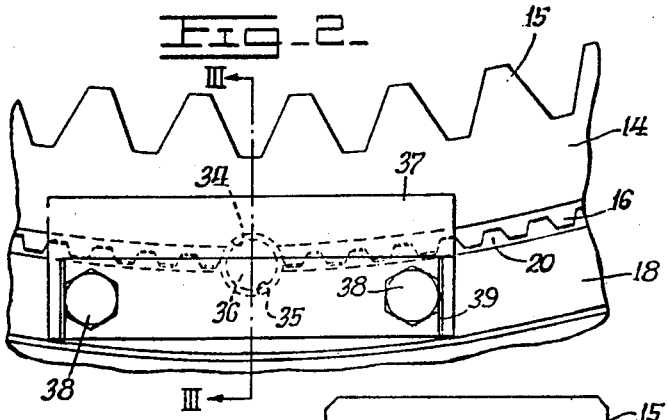
Fig. 3
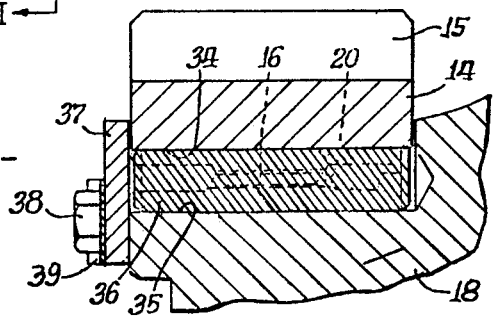

The file of this unexamined application may be inspected and copies thereof may be purchased (849 O.G. 1221, Apr. 9, 1968).